(12) United States Patent
Tash (10) Patent No.: US 6,289,935 B1
(45) Date of Patent: Sep. 18, 2001

(54) DRAINPIPE TEST PLUG DEVICE

(76) Inventor: George Tash, 5777 Balcom Canyon Rd., Somis, CA (US) 93066

( * ) Notice: Subject to any disclaimer, the term of this patent is extended or adjusted under 35 U.S.C. 154(b) by 0 days.

(21) Appl. No.: 09/650,354

(22) Filed: Aug. 25, 2000

(51) Int. Cl.$^7$ .................................................. F16L 55/10
(52) U.S. Cl. ................................. 138/97; 138/94; 138/89
(58) Field of Search ............................ 138/93, 94, 90, 138/92, 89

(56) References Cited

U.S. PATENT DOCUMENTS

| | | | | |
|---|---|---|---|---|
| 2,198,854 | * | 4/1940 | Behringer | 138/94 |
| 2,327,615 | * | 8/1943 | Ankarlo | 138/94 X |
| 2,373,242 | * | 4/1945 | Glashow | 138/89 |
| 3,019,819 | * | 2/1962 | Ankarlo | 138/94 X |
| 3,154,106 | * | 10/1964 | Ver Nooy | 138/94 |
| 3,626,475 | * | 12/1971 | Hicks | 138/94 |
| 3,665,966 | * | 5/1972 | Ver Nooy | 138/93 |
| 3,774,646 | * | 11/1973 | Smith | 138/93 |
| 4,040,450 | * | 8/1977 | Boundy | 138/94 |
| 4,202,377 | * | 5/1980 | Harrison | 138/94 |
| 5,082,026 | * | 1/1992 | Smith | 138/89 X |
| 5,297,581 | * | 3/1994 | Godfrey | 138/94 |
| 6,062,262 | * | 5/2000 | Tash | 138/89 |

\* cited by examiner

Primary Examiner—Patrick Brinson
(74) Attorney, Agent, or Firm—Lyon, Harr & DeFrank; Mark Watson; Richard Lyon (57) ABSTRACT

A drainpipe test plug device according to the present invention is capable of being easily inserted through an opening such as a drain clean-out or other side opening to effectively seal a pressurized drainpipe. Further, the drainpipe test plug device is capable of maintaining a seal against fluid pressure in a piping system for any desired length of time without bleeding or leakage past the drainpipe test plug device. In addition, the drainpipe test plug device is adapted for use with a range of sizes of pipes by using a plug sized to fit the pipe under test. The drainpipe test plug device has a plug or seal that is rotatably coupled to a pivot arm, which is in turn rotatably coupled to a lever arm for positioning the drainpipe test plug device within a drainpipe. Consequently, the plug is capable of rotating about two axes simultaneously to effect a seal within the drainpipe. Further, a controlled pressure release is achieved by disengaging a first portion of the plug from the interior wall of the drainpipe to break the seal between the plug and the interior wall while maintaining a second portion of the plug in contact with the interior wall of the drainpipe. Latches coupled to either or both the lever arm and positioning arm are used to limit the rotation and displacement of the plug relative to the interior walls of the drainpipe to effect the controlled release of pressure.

30 Claims, 8 Drawing Sheets

DRAINPIPE TEST PLUG DEVICE

BACKGROUND

1. Technical Field

This invention relates to plumbing devices for preventing the flow of water in pipes, and more particularly, to a test plug device for sealing drainpipes.

2. Related Art

Devices for plugging pipes into prevent the flow of water are commonly used when testing pipe systems for leaks in homes, apartments or other buildings. When testing for leaks, the main drainpipe in a building is typically sealed or plugged via a side opening or clean-out pipe attached to the main drainpipe at a point near the main sewer line that serves the building. The building's pipe system is then typically pressurized by filling the system with water. The pressurized system is then inspected for leaks. Following completion of leak inspections, the device used to seal or plug the drain is removed to drain the water from the pipe system.

One type of plug device used to seal drainpipes is an inflatable cylindrical plug that is inserted into a drainpipe, and then pressurized with either air or water to block the flow of water within the drainpipe by expanding to completely seal the pipe. However, the pressure in a piping system filled with water increases in direct proportion to the height of the piping system. Consequently, devices used to seal main drainpipes in buildings must withstand an increasing amount of pressure as the height of the building increases. Inflatable cylindrical plugs are limited as to the external pressure they may withstand. As the pressure in a drainpipe begins to exceed the pressure within the inflatable plug, the plug will tend to compress, thereby allowing water to flow within the drainpipe. Increasing the pressure in the inflatable plug to compensate for increased pressure within the pipe increases the risk of rupture of the inflatable plug. Further, such devices tend to bleed pressure over time, thereby again allowing water to flow within the drainpipe. Consequently, the utility of such devices tends to be limited by the height of the piping system in which they are used, the pressure within that system, and the length of time that the device is pressurized.

Other devices have been developed that involve the use of solid plugs to seal or plug a drainpipe. Various mechanisms have been used to position such plugs within a drainpipe, and to hold the plugs in place when they are exposed to pressure in the drainpipe. For example, one device uses an elliptical plug coupled to an arm that is bolted to a cap, which in turn is coupled to the open end of a straight pipe. However, because this device is designed for use with a straight pipe it is not useful for plugging a pipe via a side opening or clean-out pipe attached to the main drainpipe.

Another device uses a solid plug that is inserted into a T, or 90-degree opening in the side of a pipe. A locking lever arm coupled to the plug is used to position the plug within the drain, and to lock the plug into position during use. However, as with the previously mentioned solid plug device, this device is not useful for plugging a pipe via a drain clean-out where the clean-out is at an angle other than approximately 90 degrees to the main drainpipe.

Therefore, in order to overcome the limitations of current pipe plug devices, what is needed is a plug device that is capable of withstanding increased pressure within a drainpipe for any desired length of time. Further, such a plug device should have the capability of being easily inserted through a drain clean-out or any other side opening to plug the drainpipe. Finally, such a plug device should be simple, capable of being easily fabricated and used, and should be inexpensive and durable.

SUMMARY

The present invention involves a new device for plugging a drainpipe via an opening such as a drain clean-out or any other side opening. This device satisfies all of the foregoing needs. The drainpipe test plug device of the present invention is capable of being easily inserted through an opening in a drainpipe to plug the drainpipe. Further, the drainpipe test plug device is capable of maintaining a seal against fluid pressure in a piping system for any desired length of time without bleeding or leakage past the drainpipe test plug device. In addition, the drainpipe test plug device is adapted for use with a range of sizes of pipes by using a plug sized to for the pipe under test. Finally, the drainpipe test plug device can be easily and inexpensively fabricated, preferably having rigid or semi-rigid members of metal, plastic, or ceramic and a flexible plug of a durable rubber, plastic, or silicon compound.

A drainpipe test plug device according to present invention has a plug or seal that is rotatably coupled to a pivot arm, which is in turn rotatably coupled to a lever arm or handle for positioning the drainpipe test plug device within a drainpipe. Consequently, the plug is capable of rotating about two axes simultaneously to effect a seal within the drainpipe. In addition, a brace coupled to the lever arm provides a positive stop for locking the plug into a sealing position within the drainpipe by stopping the rotation of the pivot arm. In one embodiment, a positioning arm may be coupled to the plug for rotating and positioning the plug within the drainpipe during use.

In further embodiments of the drainpipe test plug device, a latch is coupled to either or both the lever arm and the positioning arm to allow for a controlled pressure release when disengaging a seal in a pipe under pressure. This controlled pressure release is achieved by disengaging a first portion of the plug from the interior wall of the drainpipe to break the seal between the plug and the interior wall while maintaining a second portion of the plug in contact with the interior wall of the drainpipe. Either or both of the latches are used to limit the rotation and displacement of the plug relative to the interior wall of the drainpipe to effect the controlled release of pressure.

The lever arm is a rigid or semi-rigid member preferably formed of metal, a high-density polymer, ceramic, or other suitable material. The lever arm is used to insert the plug into the drainpipe, manipulate the plug within the pipe, and support the pivot arm and plug against pressure within the pipe. The lever arm has a brace on one end for bracing the pivot arm as the pivot arm locks into place during use. As the plug rotates into a sealing position during use, the pivot arm simultaneously rotates through 90 degrees relative to the lever arm and locks into place against the brace. The brace is preferably integral to the lever arm. However, in an alternate embodiment, the brace is coupled to the lever arm using conventional methods such as, for example, bolts, welds, rivets, adhesives, or screws.

The pivot arm is rotatably attached to the lever arm to allow the plug to rotate about the lever arm. Further, because the plug is rotatably connected to the pivot arm, the plug also rotates about the pivot arm. Consequently, the plug is capable of rotating about the lever arm and the pivot arm simultaneously. As a result, the plug is capable of rotating into position to form an effective seal within the pipe.

The plug is designed to seat securely within the interior walls of a pipe, and may be circular, elliptical, or any other shape sufficient to completely seal the pipe when the plug is locked into place during use. The plug is capable of forming a mechanical seal with the pipe. Further, once the mechanical seal is formed, the lower surface of the plug is supported by the pivot arm, which is in turn locked into position against the brace as described above. Consequently, as pressure is applied to the upper surface of the plug from within the pipe during use, the plug compresses longitudinally, thereby expanding radially against the internal walls of the drainpipe to further improve the seal within the pipe. Additionally, the pressure applied to the upper surface of the plug also tends to cause a rotational force in the pivot arm in the direction of the brace. Therefore, pressure applied to the plug tends to force the pivot arm against the brace, thereby ensuring that the plug remains securely seated in a sealing position within the pipe.

Further, in one embodiment, the plug is designed with at least one cutout or opening in the upper surface of the plug. These cutouts tend to cause the sides of the plug to compress during insertion or removal of the plug into or from the drainpipe. As a result, less force is required to insert or remove the plug than would be required to insert or remove a solid plug. This feature also allows the insertion of the plug into drainpipes that are undersized. Further, when the drainpipe is pressurized, the cutouts in the top of the plug tend to cause the sides of the plug to expand radially against the walls of the drainpipe, thereby further improving the seal.

In a further embodiment of the plug, at least one through hole is included in the sides of the plug. These through holes are in fluid communication with the aforementioned cutout. In this embodiment, the cutouts are preferably filled with a lubricant such as grease, or any other lubricant. Consequently, as the sides of the plug compress as the plug is inserted into the drainpipe, the lubricant is forced from within the drainpipe and through the through holes to contact the sides of the drainpipe. In this manner, insertion and removal of the plug into or from the drainpipe is facilitated.

The foregoing and still further features and advantages of the present invention as well as a more complete understanding thereof will be made apparent from a study of the following detailed description of the invention in connection with the accompanying drawings and appended claims.

DESCRIPTION OF THE DRAWINGS

The specific features, aspects, and advantages of the present invention will become better understood with regard to the following description, appended claims, and accompanying drawings in which like reference numbers represent corresponding parts throughout.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Introduction:

The drainpipe test plug device according to the present invention is capable of being easily inserted through an opening such as a drain clean-out or any other side opening of a drainpipe to effectively seal a pressurized drainpipe. Further, the drainpipe test plug device is capable of maintaining a seal against fluid pressure in a piping system for any desired length of time without bleeding or leakage past the drainpipe test plug device. In a tested embodiment, the drainpipe test plug device of the present invention was shown to be capable of forming a seal that could withstand a pressure of up to at least 100 pounds per square inch (psi), and to effect a controlled release of such pressure when desired. A pressure of 100 psi is approximately equivalent to the pressure produced at the base of a piping system filled with water in a twenty-story building.

Figure 1:
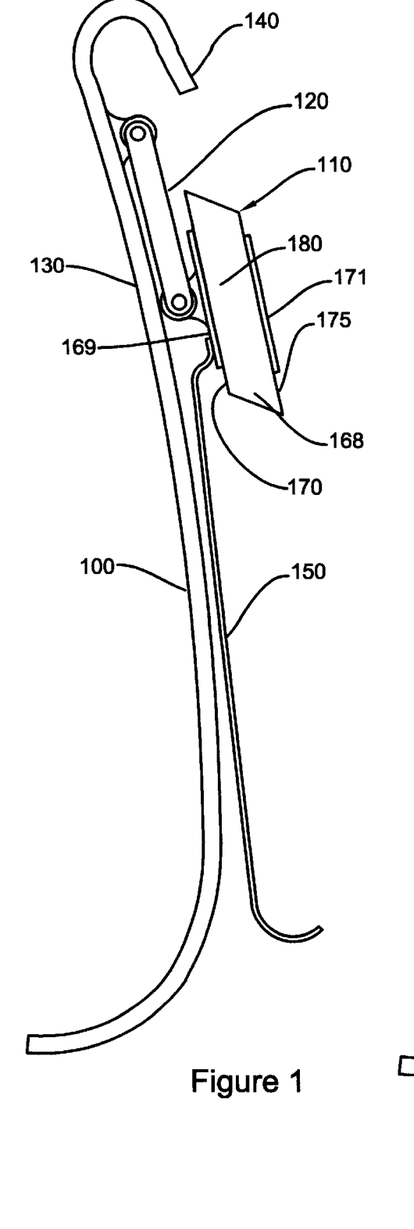
FIG. 1 is an exemplary schematic side view of a drainpipe test plug device according to the present invention.
Figure 2:
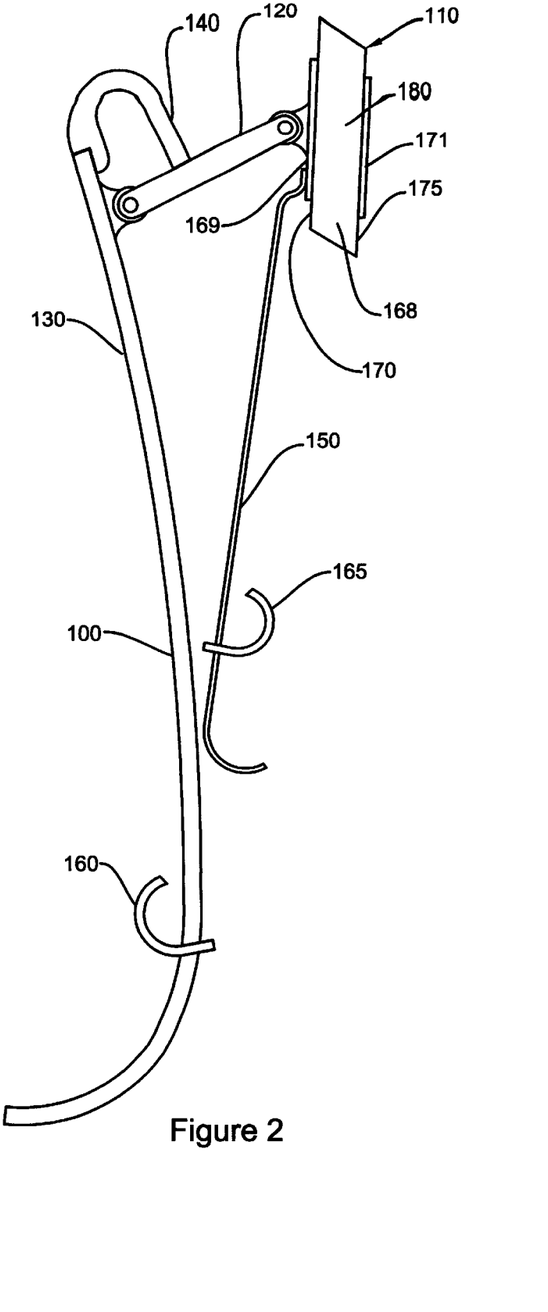
FIG. 2 is an exemplary schematic side view of an alternate embodiment of a drainpipe test plug device according to the present invention, shown in a locked position.

As illustrated in FIG. 1 and FIG. 2, a drainpipe test plug device 100 according to present invention has a seal or plug assembly 110 that is rotatably coupled to a pivot arm 120, which is in turn rotatably coupled to a handle or lever arm 130 for positioning the drainpipe test plug device within a drainpipe or other pipe. The plug assembly 110 is capable of rotating about two axes simultaneously to effect a seal within the drainpipe. In addition, a brace 140 coupled to the lever arm 130 provides a positive stop for locking the plug assembly 110 into a sealing position within the drainpipe by stopping the rotation of the pivot arm 120. In one embodiment, a positioning arm 150 may be coupled to the plug assembly for assisting in rotating and positioning the plug assembly 110 within the drainpipe. In further embodiments of the drainpipe test plug device 100 as illustrated in FIG. 2, latches 160 and 165 are slidably coupled to either or both the lever arm 130 and the positioning arm 150, respectively, to allow for a controlled pressure release when disengaging a seal in a pipe under pressure.

Components:

As illustrated in FIG. 1 and FIG. 2, the plug assembly 110 has a plug 168, and a lower pressure plate 169 coupled to a lower surface 170 of the plug. Further, the plug 168 has an upper surface 175, and a peripheral edge surface 180. In one embodiment, an upper pressure plate 171 may be coupled to the lower pressure plate 169 through the plug 168 to hold the plug assembly 110 together. The plug assembly 110 may be circular, elliptical, or any other shape sufficient to completely seal the interior of the pipe when the plug assembly is locked into place during use. The plug 168 is formed of a resilient, flexible material, such as, for example, a rubber, plastic, or silicon compound that is designed to seat securely within the interior walls of a pipe to form a mechanical seal in the pipe. The lower pressure plate 169 is a rigid plate that is rotatably coupled to and supported by the pivot arm 120. When the plug assembly 110 is in a sealing position, pressure applied to the upper surface 175 of the plug assembly compresses the flexible plug 168 longitudinally against the pressure plate 169. Longitudinal compression of the plug 168 causes a corresponding radial expansion of the plug.

The pivot arm 120 is basically a rigid link that is rotatably attached on one end to the lever arm 130 and rotatably attached on the other end to the plug assembly 110. Consequently, the pivot arm allows the plug assembly 110 to rotate about both the lever arm 130 and the pivot arm 120 simultaneously to allow the plug assembly to rotate into position to form an effective seal within the pipe. Further, the pivot arm supports the lower surface 170 of the plug assembly 110 against pressure within the piping system when the plug assembly is in a sealing position.

The lever arm 130 is a rigid or semi-rigid member preferably formed of metal, a high-density polymer, ceramic, or other suitable material. The lever arm 130 is used to insert the plug assembly 110 into the drainpipe, manipulate the plug assembly within the pipe, and support the pivot arm 120 and plug assembly against pressure within the piping system. The lever arm 130 has a brace 140 on one end for bracing the pivot arm 120 as the pivot arm locks into place during use.

The brace 140 is preferably integral to the lever arm as illustrated in FIG. 1. However, in the alternate embodiment illustrated in FIG. 2, the brace 140 is coupled to the lever arm using conventional methods such as, for example, bolts, welds, rivets, adhesives, or screws. In either embodiment, the brace 140 is used to provide a positive stop for locking the plug assembly 110 into a sealing position within the drainpipe by stopping the rotation of the pivot arm 120 as the pivot arm rotates past about 90 degrees relative to the lever arm 130. However, as the rotation of the pivot arm 120 past the 90-degree position increases, it has been observed that an increasing amount of force is required to release the plug assembly 110 from the sealing position described above. Consequently, the brace 140 is preferably positioned to allow the pivot arm 120 to rotate a desired amount past 90 degrees such that the force required to release the plug assembly 110 from the sealing position may be controlled. In a tested embodiment, the brace 140 was positioned such that the pivot arm 120 was allowed to rotate about 7 degrees past the 90-degree position relative to the lever arm 130. In this position, satisfactory sealing of the pipe was achieved, while the force required to release the plug assembly 110 from the sealing position allowed for easy operation of the drainpipe test plug device 100.

In one embodiment, the positioning arm 150 is coupled to the plug assembly for assisting in rotation and positioning of the plug assembly within the drainpipe. As with the lever arm 130, the positioning arm is a rigid or semi-rigid member preferably formed of metal, a high-density polymer, ceramic, or other suitable material.

In alternate embodiments, as described above and illustrated in FIG. 2, latches 160 and 165 are slidably coupled to either or both the lever arm 130 and the positioning arm 150, respectively. Because the latches 160 and 165 are slidably coupled to the lever arm they may be used with a range of sizes of drain side openings. The latches 160 and/or 165 are used to hold either or both the lever arm 130 or positioning arm 150 against the inner surface of the drain clean-out to limit the displacement and rotation of the plug assembly 110. Limiting the displacement and rotation of the plug assembly 110 allows for a controlled pressure release when disengaging a seal in a pipe under pressure Operation:

The following discussion provides an exemplary description of a preferred mode of operation. This discussion is intended for illustrative purposes only, and is not intended to limit the scope of the invention.

Figure 3:
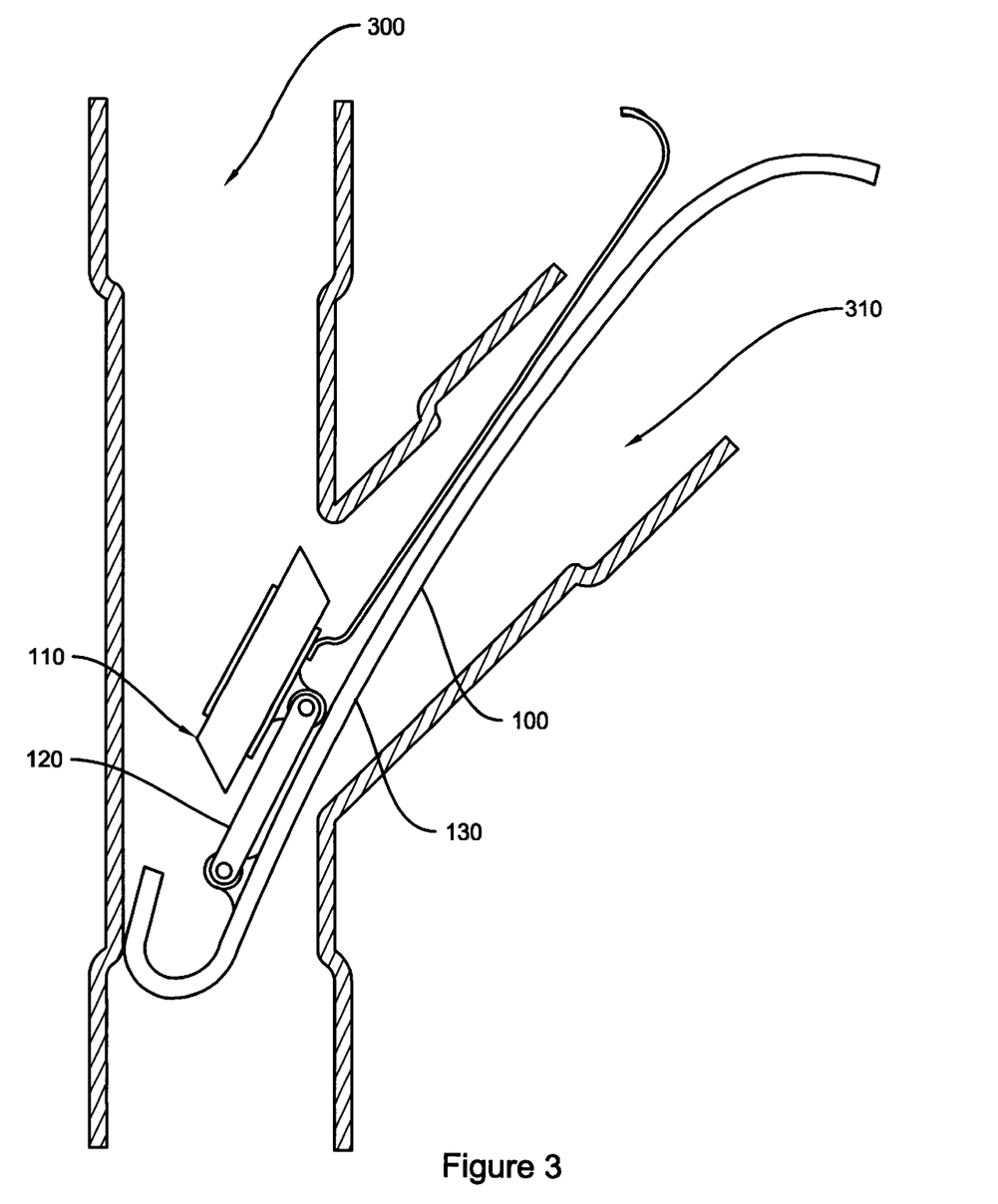
FIG. 3 is an exemplary side view of the drainpipe test plug device of FIG. 1, shown being inserted into a pipe via a pipe clean-out.

FIG. 3 is an exemplary side view of the drainpipe test plug device 100 shown being inserted into a drainpipe 300 via a drain or pipe clean-out 310 or other side opening. The drainpipe test plug device 100 is inserted into the drainpipe 300 by pushing it into the drainpipe via the lever arm 130. Further, grease or any type of non-corrosive lubricant may be applied to the plug assembly 110 prior to insertion to assist in inserting the plug into the pipe. During insertion, the pivot arm 120 rests against the lever arm 130, and the plug assembly 110 in turn rests against the pivot arm. In this position, the profile of the drainpipe test plug device 100 is minimized for easier insertion into the drainpipe 300.

Figure 4:
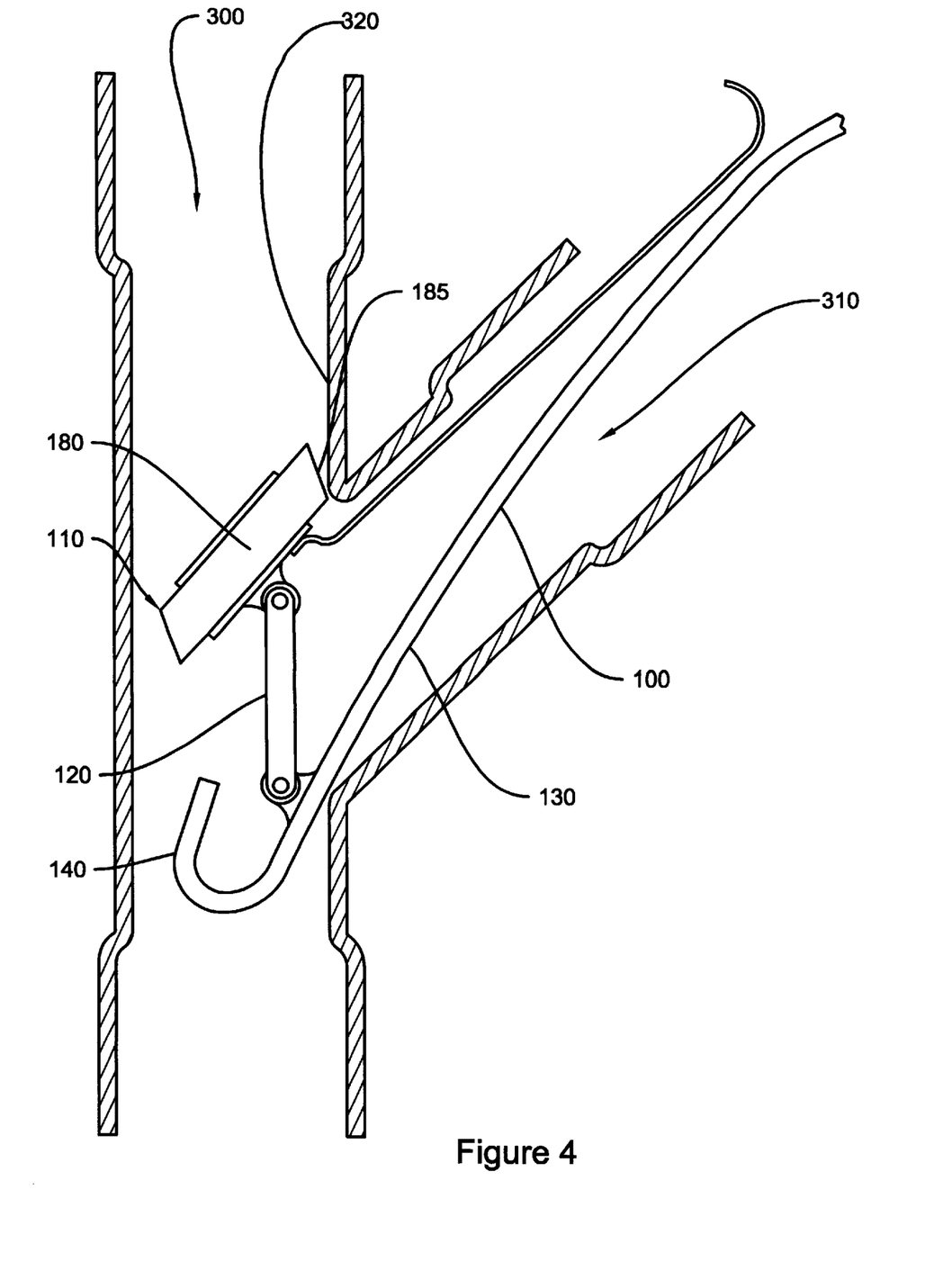
FIG. 4 is an exemplary side view of the drainpipe test plug device of FIG. 3, shown with a plug being rotated into position to seal the pipe.

Once the drainpipe test plug device 100 has been fully inserted into the drainpipe 300, the lever arm is angled slightly up and pulled in a direction out of the drain clean-out 310. Next, as illustrated in FIG. 4, as the lever arm 130 is pulled in a direction up and out of the drain clean-out, a leading edge 185 of the peripheral edge surface 180 of the plug assembly 110 contacts the inner surface 320 of the drainpipe 300. As the lever arm 130 is pulled further, the contact between the leading edge 185 of the peripheral edge surface 180 and the inner surface of the drainpipe 300 causes both the pivot arm 120 and the plug assembly 110 to begin rotating into the sealing position illustrated in FIG. 5.

Figure 5:
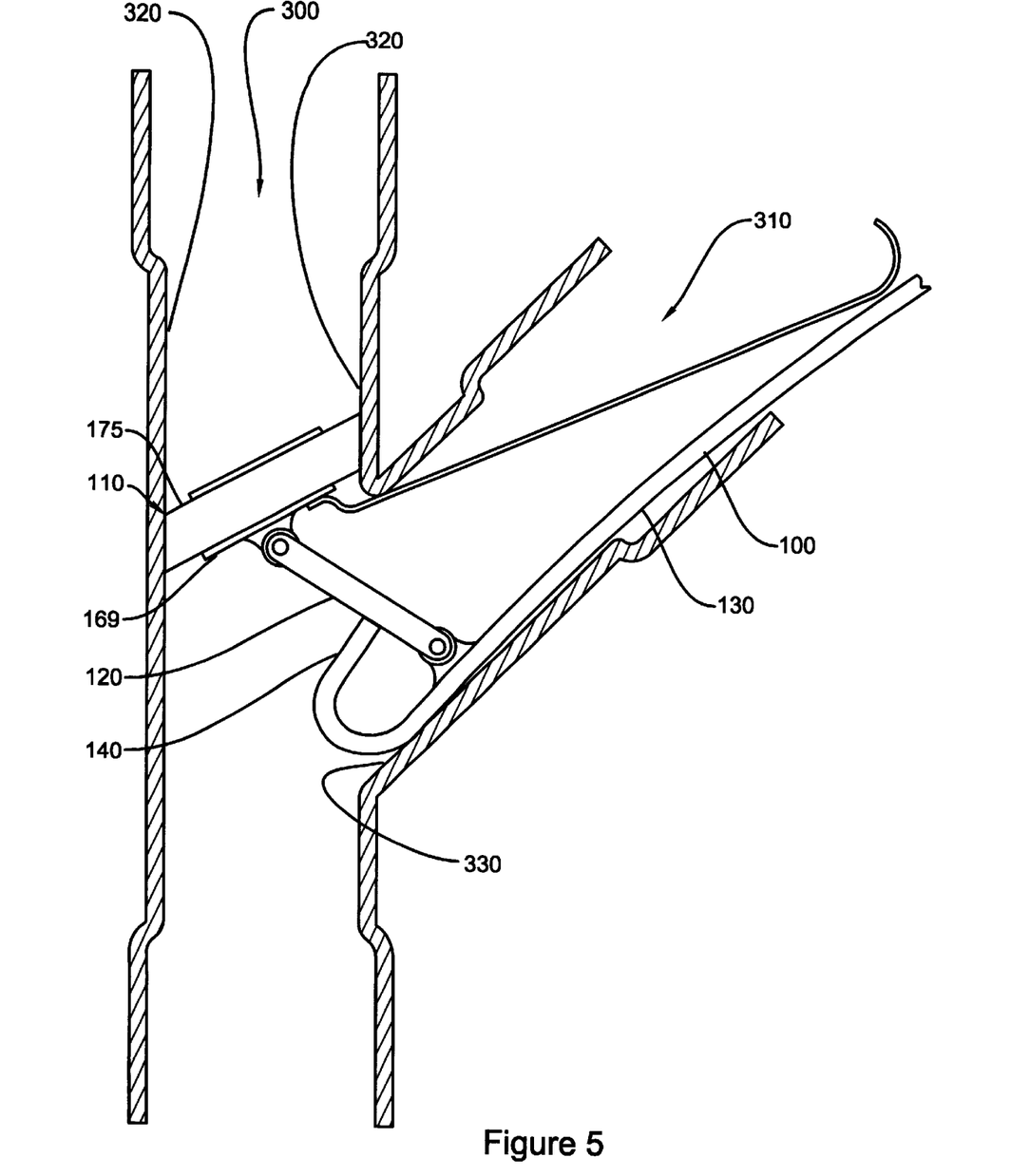
FIG. 5 is an exemplary side view of the drainpipe test plug device of FIG. 4, shown with the plug in a locked sealing position within the pipe.

FIG. 5 illustrates the plug assembly 110 in a locked sealing position within the drainpipe 300. As illustrated by the combination of FIG. 4 and FIG. 5, when the plug assembly 110 rotates into a sealing position within the drainpipe 300, the pivot arm 120 simultaneously rotates through 90 degrees relative to the lever arm 130 and locks into place against the brace 140. Further, as the plug assembly 110 rotates into the sealing position illustrated in FIG. 5, the lever arm 130 is forced against the interior wall 330 of the drain clean-out 310 to hold the drainpipe test plug device 100 in a locked position. Consequently, with the drainpipe test plug device 100 in the position illustrated in FIG. 5, the plug assembly 110 forms a mechanical seal with the interior walls 320 of the drainpipe 300. Once this mechanical seal is formed, the lower pressure plate 169 of the plug assembly 110 is supported by the pivot arm 120, which is in turn locked into position against the brace 140 as described above. Consequently, as fluid pressure is applied to the upper surface 175 of the plug assembly 110 from within the drainpipe 300, the plug assembly compresses longitudinally, thereby expanding radially against the internal walls 320 of the drainpipe to further improve the seal within the drainpipe. Additionally, the pressure applied to the upper surface 175 of the plug assembly 110 also tends to cause a rotational force in the pivot arm 120 in the direction of the brace 140. Therefore, pressure applied to the upper surface 175 of the plug assembly 110 tends to force the pivot arm 120 against the brace 140, thereby ensuring that the plug assembly 110 remains securely seated in a sealing position within the pipe.

Reversing the above-described process breaks the seal within the drainpipe 300. In other words, pushing the lever arm 130 further into the drain clean-out 310 breaks the seal between the interior walls 320 of the drainpipe 300 and the plug assembly 110. However, when breaking the seal within the drainpipe 300, there is a possibility of unsanitary splashback or ejection of pressurized fluids from the drain clean-out 310. To avoid this potential problem, the pressure within the drainpipe 300 may released in a controlled manner by breaking the aforementioned seal in a controlled fashion using either or both of the aforementioned latches 160 and 165 in the manner described below.

Figure 6A:
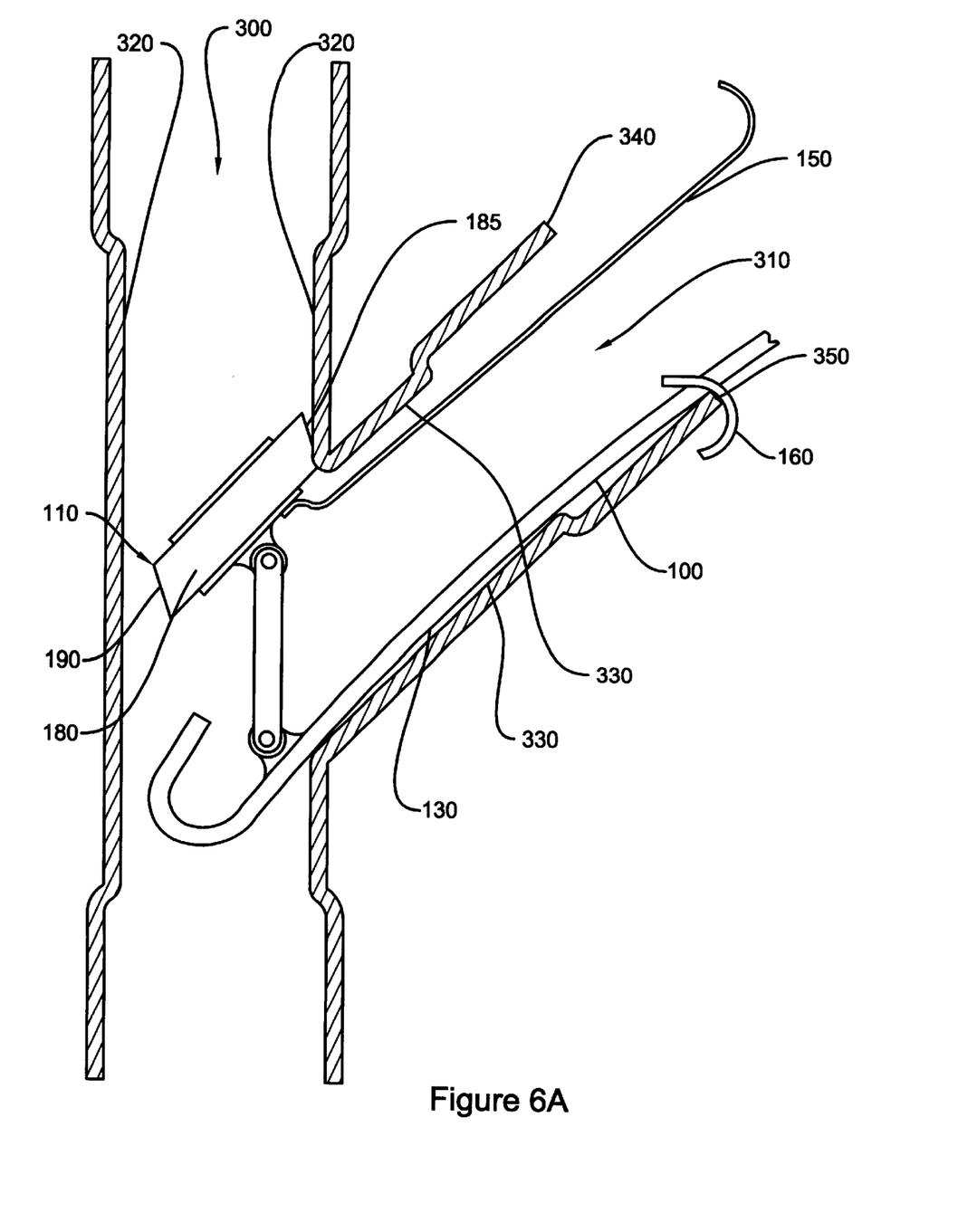
FIG. 6A is an exemplary side view of a first alternate embodiment of a drainpipe test plug device according to the present invention shown in position to release pressure within a pipe.
Figure 6B:
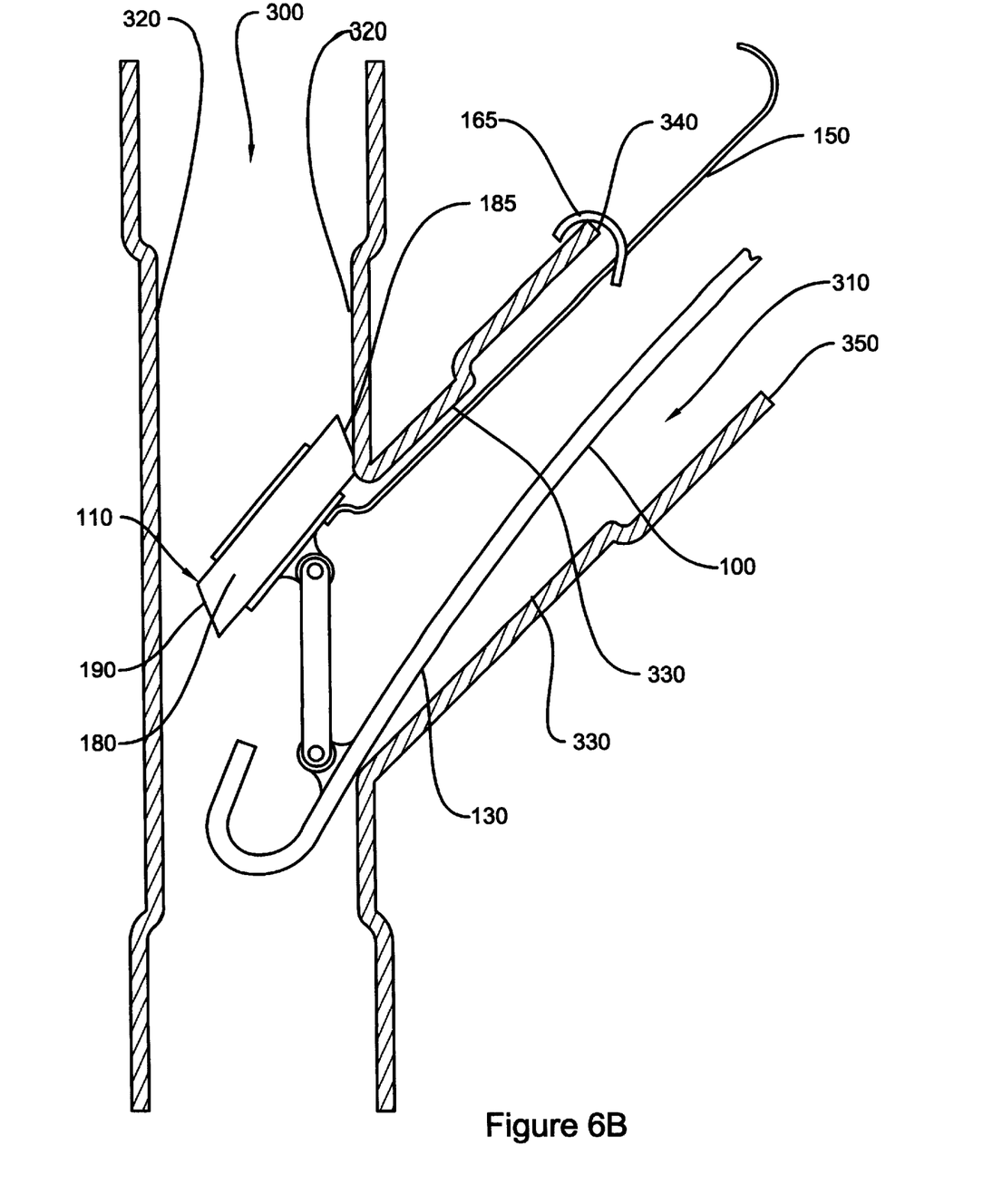
FIG. 6B is an exemplary side view of a second alternate embodiment of a drainpipe test plug device according to the present invention shown in position to release pressure within a pipe.
Figure 6C:
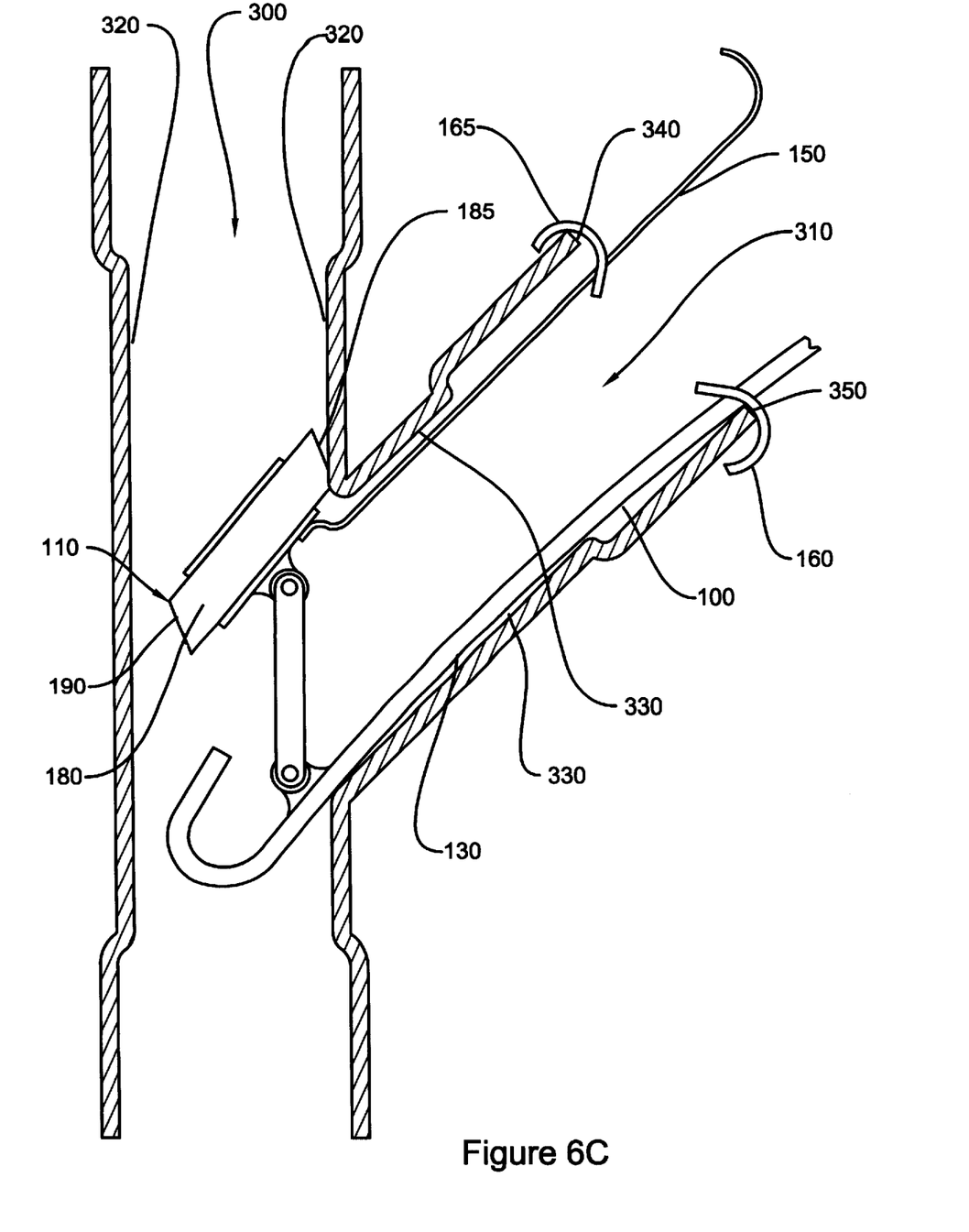
FIG. 6C is an exemplary side view of a third alternate embodiment of a drainpipe test plug device according to the present invention shown in position to release pressure within a pipe.

Specifically, FIGS. 6A, 6B and 6C illustrate exemplary side views of alternate embodiments of a drainpipe test plug device 100 according to the present invention showing either or both latches 160 and 165 in use. Latches 160 and 165 may be used either individually or in combination to assist in positioning the plug assembly 110 to effect a controlled release of pressure from within the drainpipe. This controlled pressure release is achieved by holding the lever arm 130 apart from the positioning arm 150 while pushing the lever arm further into the drain clean-out 310. The latches 160 and 165 are used to hook the edge 340 or 350 of the opening to the drain clean-out 310, thereby holding either or both the lever arm 130 and the positioning arm 150 against the interior walls 330 of the drain clean-out. Using the latches 160 and or 165 in this fashion assists in holding the lever arm 130 apart from the positioning arm 150 as described above.

With the lever arm 130 held apart from the positioning arm 150, pushing the lever arm 130 further into the drain clean-out 310 causes the trailing edge 190 of the peripheral edge surface 180 of the plug assembly 110 to disengage from the interior wall 320 of the drainpipe 300. Consequently, the seal between the trailing edge 190 of the peripheral edge surface 180 and the interior wall 320 of the drainpipe 300 is broken, while contact between the leading edge 185 of the peripheral edge surface remains in contact with the interior wall of the drainpipe. Pressurized fluid within the drainpipe is thereby released along the portion of the interior wall 320 of the drainpipe 300 farthest from the opening to the drain clean-out 310. Further, with the plug assembly 110 in the above-described position, it serves to further shield the drain clean-out 310 from possible splashback or ejection of pressurized fluids from the drain clean-out.

Figures 7A, 7B:
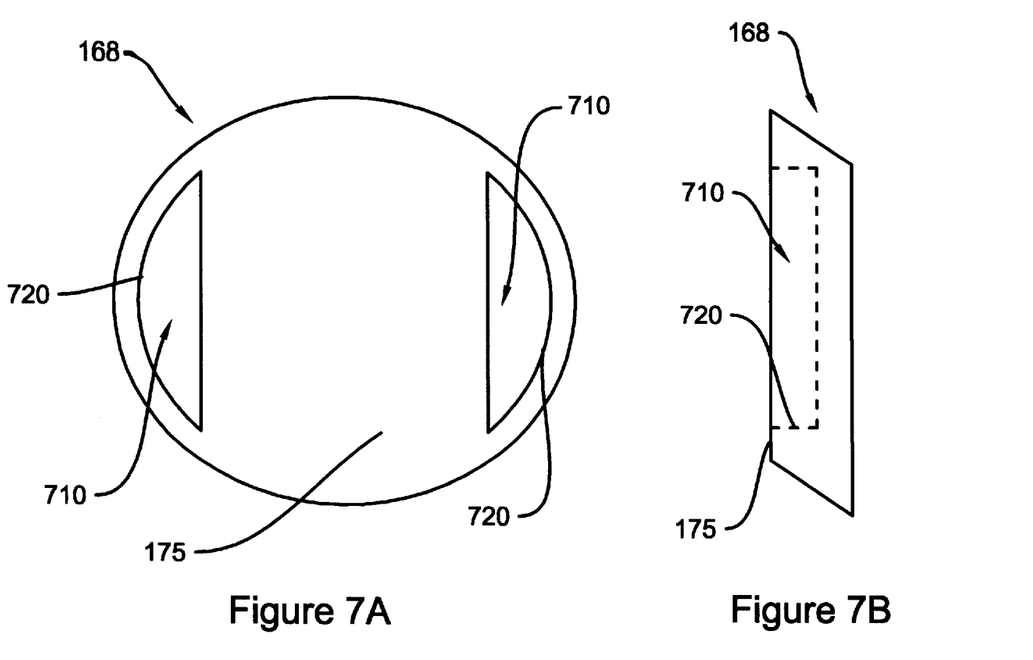
FIG. 7A is an exemplary top view of an alternate embodiment of a plug according to the present invention, shown having cutouts in the upper surface of the plug.
FIG. 7B is an exemplary side view of the plug of FIG. 7A.

Additional Embodiments:

In an additional embodiment of the plug 168, as illustrated in FIG. 7A and FIG. 7B, the plug 168 is designed with at least one opening 710, such as a cutout or slot, in the upper surface 175 of the plug. These cutouts 710 tend to collapse, thereby causing the sides of the plug 168 to compress during insertion or removal of the plug into or from the drainpipe. As a result, less force is required to insert or remove the plug 168 than would be required to insert or remove a solid plug. This feature also allows the insertion of the plug 168 into drainpipes that are undersized. Consequently, this feature is advantageous because the interior diameter of pipes, such as cast iron pipes, often varies slightly from manufacturer to manufacturer, or from batch to batch for a given nominal pipe diameter. Further, when the drainpipe is pressurized, the cutouts 710 in the upper surface 175 of the plug 168 tend to cause the sides of the plug to expand radially against the walls of the drainpipe, thereby further improving the seal. This radial expansion of the plug 168 is produced because as the interior walls 720 of the cutouts 710 are exposed to fluid pressure, those walls will tend to be forced outward, towards the interior walls of the drainpipe.

Figure 7C:
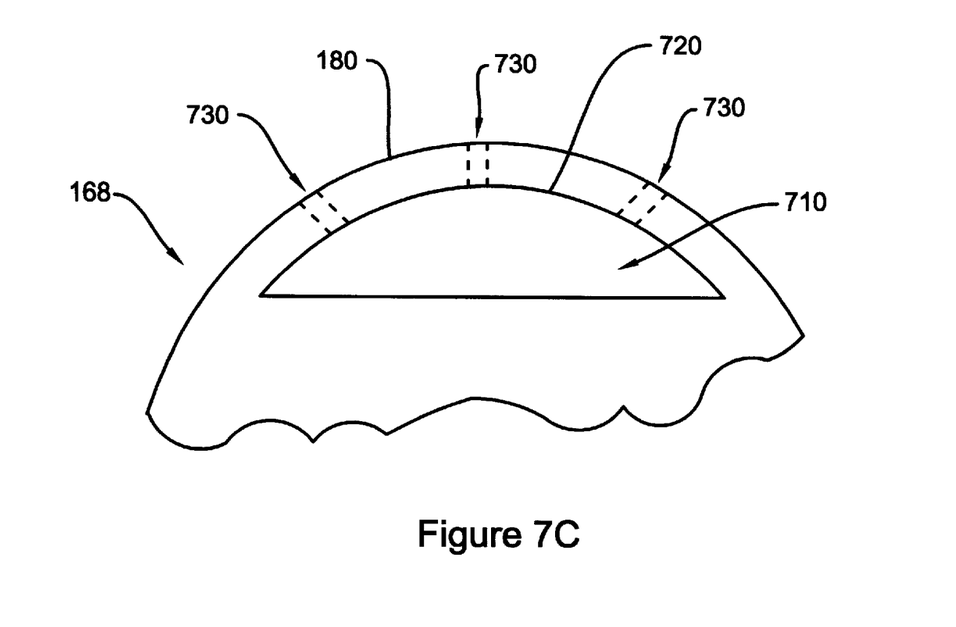
FIG. 7C is an exemplary partial top view of a further alternate embodiment of the plug of FIG. 7A, shown with through holes from the sides of the plug to the cutouts in the upper surface of the plug.

In a further embodiment of the plug 168, as illustrated in FIG. 7C, at least one through hole 730 is included in the peripheral edge surface 180 of the plug 168 for each cutout 710. Each through hole 730 is in fluid communication with one of the aforementioned cutouts 710, thereby providing an open pathway from each cutout to the peripheral edge surface 180 of the plug 168. In this embodiment, the cutouts 710 are preferably filled with a lubricant such as grease, or any other lubricant. Consequently, as the peripheral edge surface 180 of the plug 168 compress as the plug is inserted into the drainpipe, the lubricant is forced from within the drainpipe and through the through holes 730. Consequently, the lubricant serves to lubricate the interface between the peripheral edge surface 180 of the plug 168 and the interior walls of the drainpipe. In this manner, insertion and removal of the plug 168 into or from the drainpipe is facilitated. Further, because the diameter of each through hole 730 is preferably relatively small in relation to the surface area of the interior walls 720 of the cutouts 710, the ability of the plug 168 to expand radially when exposed to fluid pressure, as described above, is not compromised.

What is claimed is:

1. A plug assembly for plugging an inner surface of a pipe comprising:

a plug;

a pivot arm pivotally coupled to the plug;

a lever arm pivotally coupled to the pivot arm for positioning a peripheral edge of the plug in sealing contact with the inner surface of the pipe; and a brace coupled to the lever arm for supporting the pivot arm when the peripheral edge of the plug is in sealing contact with the inner surface of the pipe.

2. The plug assembly of claim 1 further comprising a positioning arm coupled to the plug for rotating the plug into a sealing position within the pipe.

3. The plug assembly of claim 1 wherein the brace is integral to the lever arm.

4. The plug assembly of claim 1 further comprising a latch slidably coupled to the lever arm for holding the plug in an intermediate position wherein only a portion of the peripheral edge is in sealing contact with the inner surface of the pipe.

5. The plug assembly of claim 2 further comprising a latch coupled to the positioning arm for holding the plug in an intermediate position wherein only a portion of the peripheral edge is in sealing contact with the inner surface of the pipe.

6. The plug assembly of claim 1 wherein the plug expands radially when exposed to fluid pressure within the pipe.

7. The plug assembly of claim 1 wherein an upper surface of the plug includes at least one slot defined by walls extending from the upper surface of the plug and into the body of the plug, and wherein each slot collapses to facilitate compression of a peripheral edge surface of the plug during insertion of the plug into a pipe.

8. The plug assembly of claim 7 wherein the plug further includes at least one through hole between the peripheral edge surface and each slot in the upper surface of the plug, and wherein lubricant placed within each slot is forced out of each through hole and between the peripheral edge surface of the plug and the inner surface of the pipe during insertion of the plug into the pipe.

9. A plug assembly for plugging drain pipes, the assembly comprising:
   a plug having an upper surface and a lower surface spaced apart from the upper surface and a peripheral surface therebetween;
   a pivot arm coupled to the lower surface of the plug for rotating the plug into a sealing position within the pipe;
   a handle coupled to the pivot arm for introducing the plug into the pipe and manipulating the plug within the pipe so that the peripheral surface of the plug sealingly engages the inner surface of the pipe; and
   a brace coupled to the handle for supporting the pivot arm when the peripheral surface of the plug sealingly engages the inner surface of the pipe.

10. The plug assembly of claim 9 further comprising a positioning arm coupled to the plug for manipulating the plug within the pipe.

11. The plug assembly of claim 9 further comprising a latch slidably coupled to the handle for releasably coupling the handle to an edge of an opening to the pipe.

12. The plug assembly of claim 10 further comprising:
   a first latch slidably coupled to the handle for releasably coupling the handle to an edge of an opening to the pipe; and
   a second latch slidably coupled to the positioning arm for releasably coupling the positioning arm to the edge of the opening to the pipe.

13. The plug assembly of claim 11 wherein releasably coupling the handle to the edge of the opening to the pipe allows for the positioning of the plug in an intermediate position within the pipe such that a first portion of the peripheral surface of the plug remains sealingly engaged to the inner surface of the pipe while a second portion of the peripheral surface of the plug is disengaged from the inner surface of the pipe.

14. The plug assembly of claim 9 wherein the lower surface of the plug further comprises a pressure plate coupled to the lower surface of the plug.

15. The plug assembly of claim 9 wherein the plug compresses laterally when exposed to fluid pressure within the pipe.

16. The plug assembly of claim 9 wherein the plug expands radially when exposed to fluid pressure within the pipe to enhance a seal between the peripheral surface of the plug and the inner surface of the pipe.

17. The plug assembly of claim 9 wherein the brace is Integral to the handle.

18. A plug assembly for plugging a pipe having a clean-out opening forming an oblique angle with the pipe, the plug assembly comprising:
   a plug;
   a pivot arm pivotally coupled to the plug;
   a lever arm pivotally attached to the pivot arm for positioning the plug within the pipe; and
   a brace on one end of the lever arm for bracing the pivot arm to support the plug in a sealing position within the pipe.

19. The plug assembly of claim 18 further comprising a first latch movably coupled to the lever arm for releasably coupling the lever arm to an edge of the clean-out opening for partially moving the plug from the sealing position within the pipe.

20. The plug assembly of claim 18 further comprising a positioning arm coupled to the plug for positioning the plug within the pipe.

21. The plug assembly of claim 20 further comprising a second latch movably coupled to the positioning arm for releasably coupling the positioning arm to an edge of the clean-out opening for partially moving the plug from the sealing position within the pipe.

22. A plug assembly for plugging a pipe to allow for fluid pressurization of the pipe comprising:
   a plug having an upper surface, a lower surface and a peripheral edge surface defined therebetween wherein the plug expands radially when exposed to fluid pressure;
   a lever arm rotatably coupled to the plug for positioning and supporting the plug within the pipe such that the peripheral edge surface engages an interior wall of the pipe to form a seal within the pipe;
   wherein the lever arm is rotatably coupled to the plug via a pivot arm that is rotatably coupled to both the lever arm and the plug; and
   a first latch coupled to the lever arm for engaging the edge of the pipe to rotate a portion of the peripheral edge surface away from the interior wall of the pipe for controllably releasing the fluid pressurization within the pipe.

23. The plug assembly of claim 22 further comprising a positioning arm coupled to the plug for manipulating the plug within the pipe.

24. The plug assembly of claim 22 further comprising a second latch coupled to the positioning arm for engaging the edge of the pipe to rotate a portion of the peripheral edge surface away from the interior wall of the pipe for controllably releasing the fluid pressurization within the pipe.

25. A method for plugging a pipe having an inner surface wherein:
   a plug having upper and lower surfaces, and a peripheral edge surface therebetween is positioned in the pipe so that the peripheral edge surface sealingly engages the inner surface of the pipe to prevent fluid flow within the pipe;

a handle pivotally coupled to the plug supports the plug while the peripheral edge surface sealingly engages the inner surface of the pipe;

wherein the plug is pivotally coupled to the handle via a pivot arm that is pivotally coupled to the plug and the handle so that the plug rotates about the pivot arm and the handle simultaneously when positioning the plug to sealingly engage the inner surface of the pipe; and a latch coupled to the handle releasably engages an edge of an opening in the pipe so that a first portion of the peripheral edge surface is disengaged from the inner surface of the pipe while a second portion of the peripheral edge surface remains sealingly engaged to the inner surface of the pipe to allow controlled fluid flow within the pipe.

26. The method of claim 25 wherein the peripheral edge surface of the plug expands radially against the inner surface of the pipe when exposed to fluid pressure within the pipe to enhance a seal between the peripheral edge surface of the plug and the inner surface of the pipe.

27. The method of claim 25 wherein the plug is rotated to sealingly engage the inner surface of the pipe by pulling the handle.

28. The method of claim 25 wherein a positioning arm coupled to the lower surface of the plug is used to assist in positioning the plug to sealingly engage the inner surface of the pipe.

29. A plug assembly for sealing a pressurized pipe, comprising:

a plug having an upper surface including at least one slot defined by walls extending from the upper surface of the plug and into the body of the plug to facilitate compression of a peripheral edge surface of the plug during insertion of the plug into a pipe a lever arm pivotally coupled to the plug for positioning the peripheral edge of the plug in sealing contact with an inner surface of the pipe; and a brace coupled to the lever arm for supporting the plug when the peripheral edge of the plug is in sealing contact with the inner surface of the pipe.

30. The plug assembly of claim 29 wherein the plug further includes at least one through hole between a peripheral edge surface of the plug and each of the slots in the upper surface of the plug, and wherein lubricant placed within each slot is forced out of each through hole and between the peripheral edge surface of the plug and an inner surface of the pipe during insertion of the plug into the pipe to facilitate insertion of the plug into the pipe.

* * * * *